United States Patent Office 3,213,585
Patented Oct. 26, 1965

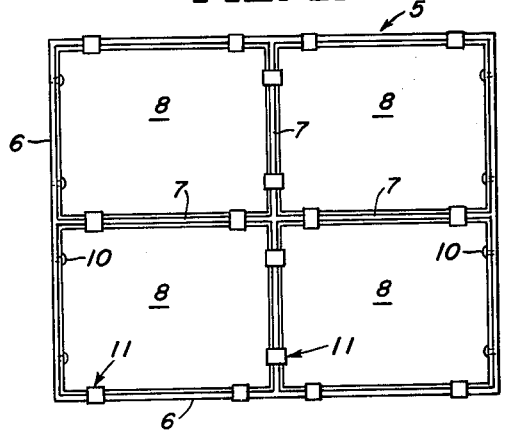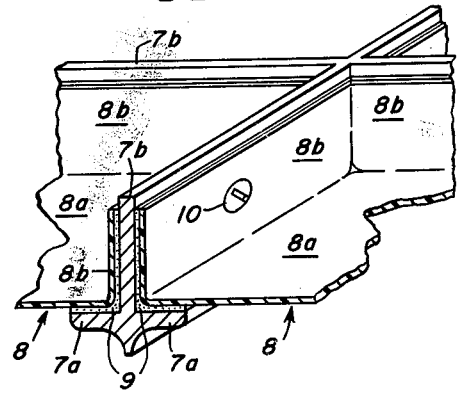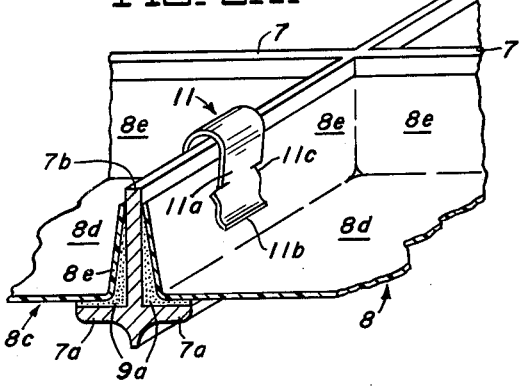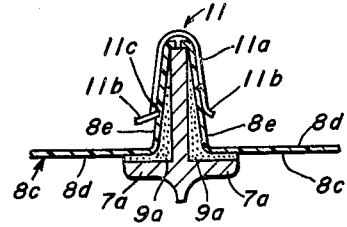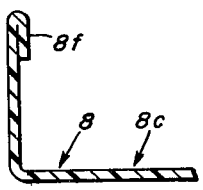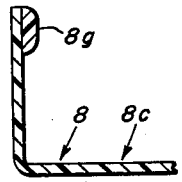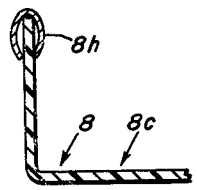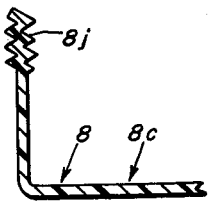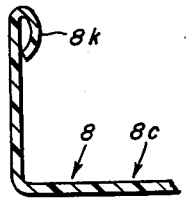
INVENTOR.
HENRY A. HARRY

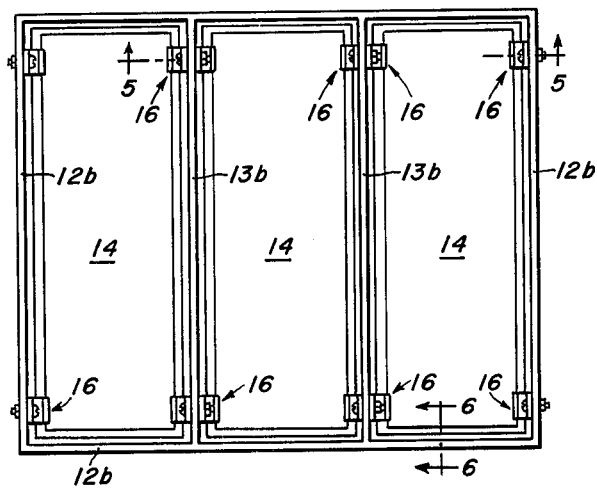
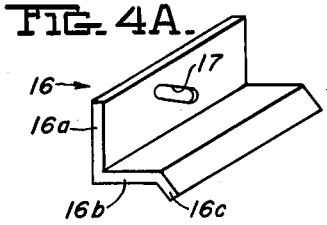
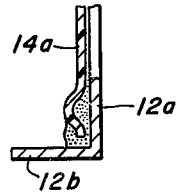
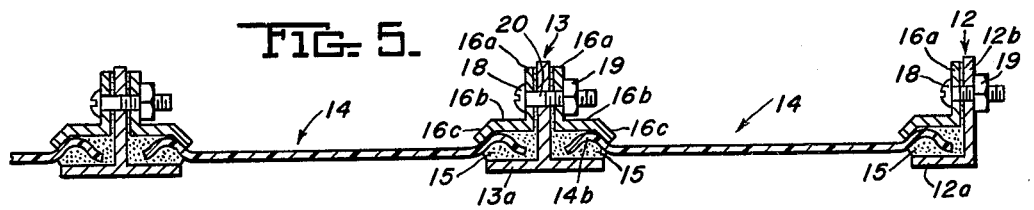
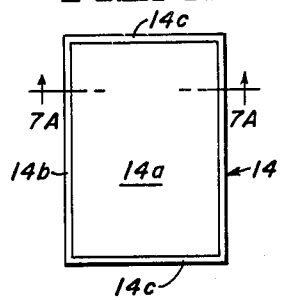
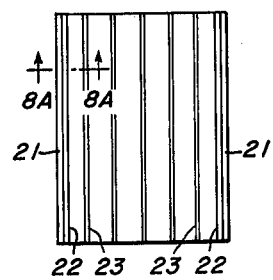
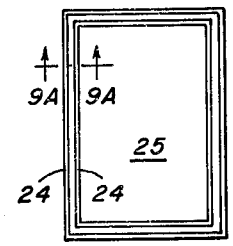
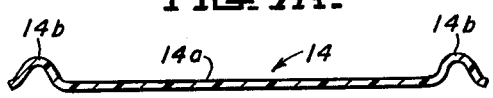
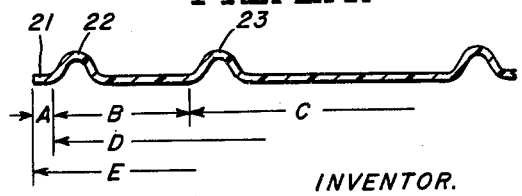
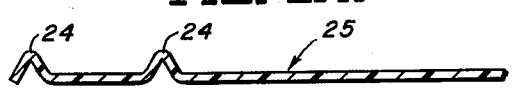

3,213,585
BUILDING STRUCTURE
Henry A. Harry, 312 N. Country Club Drive,
McHenry, Ill.
Filed Jan. 15, 1963, Ser. No. 251,675
2 Claims. (Cl. 52—456)

This application is a continuation-in-part of my co-pending applications Serial Nos. 862,971, filed December 30, 1959, and 210,922, filed July 19, 1962, and now abandoned.

The present invention relates to building panels and, more particularly, to that type of panel commonly employed in the form of relatively thin light-transmitting sheets of plastics as a substitute for glass, primarily in skylights, windows and other forms of light-transmitting panels of larger sizes.

The principal advantage of such plastic sheets and panels is that of economy in initial installation and of a greater resistance to breakage when struck by an object or subjected to abnormal wind pressures.

The principal disadvantages of plastic sheets for such panels is the difficulty in retaining them in the metal frame mountings, due to the inherent greater flexibility of the plastics than exhibited by glass. Consequently, additional labor costs in adequately securing them in place have previously made their use unsatisfactory or more costly than glass. Such fastening difficulties are due to the inherent flexibility of the panels, enabling them to buckle, bend and twist free of available fastening means and to blow out of the frames under forces not normally disturbing glass panels.

In the present invention the foregoing disadvantages are eliminated by a novel means of edge reinforcement which not only resists undesirable flexure in the panels but also facilitates fastening the panels in place to provide weatherproof sealing about the periphery of the panels at the supporting frame members.

Another object of the invention is to so reinforce the panels at the edge thereof to facilitate application of the usual glazing compounds to the frame structure and the sealing thereof with the panel reinforcements and panel fastening means.

These and other objects of the invention as well as inherent advantages therein will be made apparent from the following specification and drawing forming a part thereof wherein:

FIG. 1 shows a typical conventional four light sash equipped with one form of the panels of the invention, it will be understood that such sash may be constructed for any desired number of panels and may be a fixed sash or top hung pivoted sash or a sash opened by any other suitable means.

FIG. 2 shows an enlarged section at the mid-portion of the sash of FIG. 1, illustrating one form of panel and a fastening means therefor;

FIG. 2A shows a modified form of the panel and another form of fastening means therefor;

FIG. 2B shows a cross-section through the panel and fastener of FIG. 2A;

FIGS. 3, 3A, 3B, 3C and 3D show various forms of edge reinforcing means for the panels of FIGS. 2 and 2A;

FIG. 4 shows a typical form of larger size panels and their supporting frame;

FIG. 4A shows a perspective view of the panel clamping member;

FIG. 5 shows a section through the panel, frame and fastening means taken on lines 5—5 of FIG. 4;

FIG. 6 shows a section taken on lines 6—6 of FIG. 4;

FIG. 7 shows a plan view of the panel of FIG. 4;

FIG. 7A shows a section on lines 7A of FIG. 7;

FIG. 8 shows a plan view of a modified form of panel;

FIG. 8A shows a partial section taken on lines 8A of FIG. 8A;

FIG. 9 shows a plan view of another modified form of panel;

FIG. 9A shows a section taken on lines 9A of FIG. 9A.

Referring now in detail to FIGS. 1 and 2 of the drawing, the typical conventional sash 5 is comprised of four lights but may be of any desired number of lights. Such sashes are customarily comprised of generally angle shaped or T-bar peripheral members 6 and connecting modified T-bar shaped cross members 7 which define rectangular openings for reception of panes of glass or the plastic panels of the invention.

The plastic panels indicated generally at 8 are of pan shape having a body portion 8a and upstanding flanges 8b about the periphery of the portion 8a. As shown in FIG. 2, the flanges 8b are at substantially 90° to the body portion 8a. Upon the horizontal flanges 7a and opposite faces of the upstanding stem 7b of T-bar 7 and the corresponding legs of the angles 6 are disposed a bed of conventional bedding compound 9 to receive the panels 8. Such compounds are commercially available in both bulk or may be specially provided as preformed to shape and assembled as rolls, and serve to seal the meeting faces of the frame and panels against weather. The panels 8 disposed upon such bedding compound may be secured in place by conventional self-tapping screws 10, suitable holes for which may be drilled through the panel flanges 8b and the adjacent sash members. In place of screws one of the commercially available snap in clips may be used. The number and spacing of screws or snap in clips 10 would normally be determined by the size of the panles. For an installation such as shown in FIG. 2, two such screws may be applied to two or more of the four flanges 8b of panel 8.

Modified forms of panel and fastening means are shown in FIGS. 2A and 2B. Here the panel 8c has a body portion 8d and peripheral flanges 8e enclosing tne body portion. As shown in FIGS. 2A and 2B the including angle between each flange and the body portion is greater than 90°, so that the flange extends both outwardly and upwardly from the body portion. As in FIG. 2 the layer of bedding compound 9a is disposed upon the T-bar and angles of the sash frame. Such layer of bedding compound is reduced in thickness upon the upright portions of the T-bars and angles to substantially conform with the shape of the panel flanges. Such flanges at their extreme outer edge may substantially abut the adjacent sash members.

FIG. 2B distinguishes from 2A in that the flanges 8e of the panel extend the full height of the upright legs 7b of the T-bar or angle of the sash and is provided with an out-turned portion or flange overlying the top of the said upright legs. When the clip 11, hereinafter described, is in position the panel flange is clamped against the top and side faces of the sash members.

A modified form of panel fastening means is shown in FIGS. 2A and 2B, in the form of a substantially U-shaped clip 11. Such a clip is formed of spring steel and when apart from the sash the depending leg portions 11a are spaced a distance less than the thickness of the sash frame member and the thickness of a panel flange. The outer free ends of the clip leg portions 11a may be slightly curved outwardly as at 11b so as to readily engage over the sash members and be readily deflected over the adjacent panel edge as the open end of the clip 11 is pressed downwardly over said members. The spreading of said clip leg portions 11a causes them to grip over the panel flanges securing them against the adjacent sash members. Preferably the clip leg portions 11a may be slightly sheared at their side edges, as at 11c and deflected inwardly so as to partially pierce and grip the adjacent panel flange portions resisting upwardly displacement and separation of the clip and panel flanges. Clip 11 may also be a continuous fastener covering the entire perimeter of the glazing pane.

The panels 8 and 8c of FIGS. 2 and 2A may be of any suitable light-transmitting plastic, such as the usual plastic impregnated fiberglass or wholly of suitable plastics. Several vinyl plastics possessing substantial rigidity are commercially available and are preferably employed. The body portions 8a and 8d of such panels, by reason of their peripheral flanges, have strong resistance to deflection and twisting under abnormal wind pressures.

FIGS. 3 to 3D inclusive illustrate various forms of edge reinforcements for the panel flanges of FIGS. 1 to 2A. In FIG. 3, either panel 8 or 8c may have its flange edge reinforced by bending the free edge of the flange upon itself as at 8f. This overlapping flange portion 8f is preferably disposed upon the inner face of the panel flange of either FIG. 2 or FIG. 2A. In FIG. 3A, the flange edge reinforcement 8g may be adhesively held in place and may be of any suitable material. In FIG. 3B the flange reinforcement 8h embraces both inner and outer faces of the flanges. In FIG. 3C the flange outer edge portion 8j is shown as corrugated and in FIG. 3D the flange outer edge portion 8k is rolled over to form a bead. Such reinforcements not only reinforce their associated flanges against deflection but also serve to better retain the clip fasteners 11 in place, when the ends 11b of the clips pass over and below the flange reinforcement.

The foregoing panel edge reinforcements may also be applied to a rectangular panel 8 not provided with peripheral flanges 8b and 8e. In such instances I would use the bedding compound and fastener arrangement shown in my co-pending application Serial No. 210,922, filed July 19, 1962. With such a panel I prefer to use the more rigid type of light-transmitting vinyl plastic either clear or tinted as desired.

Referring now to FIGS. 4 to 6 of the drawings, the structure therein disclosed is most advantageously employed in larger skylights, side walls and roofing panels. The plastic panels herein employ a range of sizes from 13" x 19" to 24" x 81½" and larger. It will be understood such dimensions are for purposes of illustration and not limitation.

The frames receiving and supporting such panels may be of any suitable construction, preferably angular about the periphery and with transverse T-bar connecting members. As shown in FIG. 4 to FIG. 6 inclusive, the panel supporting horizontal legs 12a of the peripheral angles 12 and head flanges 13a of the inverted T-bars 13 are disposed in a single plane and assembled by any suitable means. Correspondingly the upstanding legs 12b of the peripheral angles and the stems 13b of the T-bars are preferably the same height. Any other desired construction of frame may be employed providing suitable support for the panels and attachment of the clamping members as hereinafter discussed.

The plastic panels hereinafter discussed, although of larger size than in FIGS. 1 to 3, possess sufficient resistance to deflection when secured in place by the novel clip fastening means employed. As shown in FIGS. 7 and 9 each panel is enclosed by peripheral flanges and in FIG. 8 a plurality of longitudinally extending corrugations spaced transversely of the panel, obviates the necessity for transversely extending marginal flanges. Such construction may of course be used with any desired panel size large or small.

Referring now to FIGS. 4 to 7 inclusive, each panel 14 comprises a body portion 14a, longitudinally extending marginal corrugations 14b and transverse marginal corrugations 14c. The corrugations 14b and 14c preferably are identical and may be press molded as continuous. Upon the flanges 12a and 13a of the frame members 12 and 13 are deposited a layer of bedding compound 15 and the panels 14 are mounted thereon. Additional bedding compound may then be added so as to fill any space between the ends of the panel and adjacent upstanding frame members flush with the tops of the panel corrugations as shown in FIGS. 5 and 6. The panels 14 are then secured in place by suitable clamps. As shown in FIGS. 4 and 5 such clamps are comprised of rectangular strips 16, of metal, rigid vinyl or other suitable materials, pressed to generally angular shape having a flange portion 16a parallel with the adjacent frame members 12b and 13, a flange portion 16b overlying the top of the adjacent panel corrugation and a downwardly offset portion 16c overlying an adjacent side of the panel corrugation. Such a clamping member is shown in perspective view in FIG. 4A and has an inclined slotted opening 17 in the clamp portion 16a for reception of a suitable fastening means such as the bolt 18 and nut 19. Other suitable fasteners include a self-tapping screw or conventional spring type fasteners. The frame members 12b and 13b have suitable openings 20 drilled therein to receive the bolts 18 before assembling the panels to the frame. As shown in FIG. 5 the clamp portion 16b tends to press the panel corrugation downwardly while the clamp portion 16c tends to embrace the inner face of the corrugation and pull it towards the frame member. In this manner the clamps 16 adequately secure the panel against displacement under abnormal wind conditions and aid in resisting panel deflection or twisting. The inclined opening 17 in each clamp 16 compensates for any differences between the positions of the tops of the panel corrugations at opposite sides of the frame member by moving the clamp longitudinally of the frame member to permit assembly of the bolt 18 therewith and engagement of the bolt with the bolt opening 20 in the frame members. The number of clamps 16 employed will depend upon the length of the panel, usually two or three at each side of the panel and none across the top and bottom of the panel are adequate. Alternately a single clamp of any suitable width may be used instead of a plurality of clamps of lesser width.

Referring now to FIGS. 8 and 8A, the construction shown therein provides corrugations spaced across the entire face of the panel where desired. Such a panel is of sufficient rigidity as to permit omission of corrugations across the top and bottom edges of the sheet. Such a panel may be secured within the supporting frame by clamping members 16 as shown in FIG. 5. By reason of the flat longitudinal extensions 21 at the sides of the panel the clamp of FIG. 4A must be modified by increasing the length of portion 16b thereof so as to embrace the corrugations 22 across the top thereof and adjacent the inner face thereof as in FIG. 5.

The panel of FIGS. 8 and 8A may have its corrugations evenly spaced across the face thereof or the outermost corrugations may be of a different spacing to enable the panel to be modified at the point of erection. As indicated a given width of panel may be thus modified into different standard widths by severing equal portions from opposite sides thereof and still be adapted for fastening by the standard clamp 16. For example, assume the panel of FIG. 8A to be 24" wide as indicated at E. Assume the portion 21 to be ¼" wide, severing the portions 21 from each side of the panel, as indicated, provides an overall width of 23½" which may be secured by the clamp 16 as in FIG. 5. Additionally, the corrugation 23 may be so spaced from corrugation 22 that by severing a portion from each side as at B a panel 21" wide may be provided, as indicated. Obviously various widths of panels may be so constructed and severed to provide any preselected group of panel sizes.

Referring now to FIGS. 9 and 9a of the drawing, the corrugations 24 may be provided along both sides and ends thereof to rigidify the body portion 25 of the panel. Such a panel may be secured in the frame by the clamps 16 as disclosed.

It will be understood that I do not limit the invention herein disclosed to the specific shape or arrangement of the corrugations in the panels, the size of the panels, the specific flange shapes, that said flanges be integral or separate at the corners of the panels, or the specific shape of clamping members. Each may be modified to suit the frame mounting conditions encountered. FIGS. 7A and 9A show two different arrangements of peripheral corrugations for stiffening the panel against deflection and twisting and attachment to the mounting frame. Such peripheral corrugations may be increased in number and/or modified in shape. The clamps 16 may be lengthened or otherwise modified to accommodate the desired shape of corrugation, all without departure from the inventive concepts disclosed and claimed herein.

I claim:
1. In combination with a supporting frame defined by a plurality of upstanding frame members having opposing bottom flanges defining panel receiving and supporting recesses
   (a) a relatively thin light-transmitting panel body portion received in said frame recesses,
   (b) flanges at each side of the panel body portion extending thereabove and forming an included angle with said body portion greater than 90°,
   (c) a layer of conventional bedding material disposed between said frame members and said panel body peripheral edge portions and body flange partions, and
   (d) U-shaped clips of spring metal enclosing each panel flange and adjacent frame members, opposite leg portions of said U-shaped clips having opposing projections thereon for gripping the adjacent panel flange portions to retain the panels and frame members in assembled relation.

2. In combination with a supporting frame defined by a plurality of upstanding frame members having opposing bottom flanges defining panel receiving and supporting recesses, a light-transmitting panel of suitable dimensions receivable in said recesses between said upstanding frame members and overlapping said opposing bottom flanges thereof, each said panel having at least two opposite marginal edge portions defined by integral substantially inverted U-shaped corrugations, a layer of bedding compound disposed upon said frame opposing bottom flanges and providing support for said panel peripheral edge prtions, and clamping means securing said panel corrugations to said upstanding frame members, said means comprising a generally rectangular body portion having an upstanding leg abutting the adjacent upstanding frame member, an outstanding leg overlying and depending downward over the adjacent panel corrugation, and a fastening member for clamping said upstanding leg portion to said adjacent frame portion and said outstanding leg portion into engagement with the adjacent panel corrugation.

References Cited by the Examiner

UNITED STATES PATENTS

| | | | |
|---|---|---|---|
| 489,322 | 1/93 | Murphy | 50—219 X |
| 1,659,539 | 2/28 | Judson | 50—219 X |
| 1,723,166 | 8/29 | Hayman | 50—213 X |
| 2,211,508 | 8/40 | Little | 50—219 X |
| 2,859,812 | 11/58 | Swanson | 160—368 |
| 2,867,857 | 1/59 | McCarthy | 189—34 X |
| 3,028,278 | 4/62 | Gronemeyer | 189—34 X |
| 3,115,728 | 12/63 | Becker | 50—213 X |

FOREIGN PATENTS 1,213,073  10/59  France.

REINALDO P. MACHADO, *Primary Examiner.*

HARRISON R. MOSELEY, *Examiner.*